United States Patent [19]

Ackley, Sr. et al.

[11] 4,437,559

[45] Mar. 20, 1984

[54] METHOD AND APPARATUS FOR REMOVING NON-RECTIFIED CAPSULES FROM A CAPSULE RECTIFICATION AND TRANSPORT DEVICE

[75] Inventors: Charles E. Ackley, Sr., Oreland; Charles E. Ackley, Jr., Philadelphia, both of Pa.

[73] Assignee: R. W. Hartnett Company, Philadelphia, Pa.

[21] Appl. No.: 939,066

[22] Filed: Sep. 1, 1978

[51] Int. Cl.³ .......................................... B65G 47/24
[52] U.S. Cl. .................................. 198/397; 198/398; 209/628; 221/157
[58] Field of Search ............... 198/398, 399, 400, 397, 198/380, 441, 384; 101/40; 221/157-162, 164, 173; 209/545, 686, 628, 659

[56] References Cited

U.S. PATENT DOCUMENTS 3,933,239  1/1976  Yoshida ..................... 221/173 X Primary Examiner—E. R. Kazenske
Assistant Examiner—Douglas D. Watts
Attorney, Agent, or Firm—Austin R. Miller

[57] ABSTRACT

A capsule rectification and transport device is disclosed. Means are provided for removing occasional improperly positioned capsules from the transported array. The capsules are carried in spaced apart pockets. When a capsule is undesirably mis-oriented with the cap portion thereof facing the wrong side of the predetermined path, a rotatable pick-off wheel grasps the cap portion, removes the capsule and drops it into a hopper.

22 Claims, 8 Drawing Figures

METHOD AND APPARATUS FOR REMOVING NON-RECTIFIED CAPSULES FROM A CAPSULE RECTIFICATION AND TRANSPORT DEVICE

BACKGROUND OF THE INVENTION

1. Field of the Invention

This invention relates to a capsule rectification apparatus and method in which means are provided to recognize, identify and remove improperly positioned capsules from the mechanism. Capsules in large numbers and at high speed are transported in an array along a predetermined path and are rectified with all of the cap portions oriented to a common direction and all of the body portions oriented in another direction. In the event of occasional, unintended mis-orientation, according to this invention, the mis-oriented capsules are recognized and identified and are quickly and reliably removed from the array.

2. Prior Art

Machines which automatically sort, transport and rectify capsules are known in the art. In many of these prior art machines, the capsules are randomly loaded into a hopper, transferred to a capsule carrying conveyor, rectified into the desired alignment and passed to another work station, such as a printing station. U.S. Pat. Nos. 3,670,865 (Garland) and 3,871,295 (Ackley) are representative of such devices. U.S. Pat. No. 3,613,831 (Whitecar) discloses yet another capsule rectification.

In U.S. Pat. No. 3,756,402 (Wagers, Jr. et al), a capsule rectification device is taught wherein a single row of rectified capsules is transported by a conveyor and then transferred to a separate inspection head wherein the capsules are spun about their axes to expose their entire surfaces for inspection as by optical means. If the capsules fail inspection, an air blast means ejects them from the inspection head.

A capsule feeding and rectification device is disclosed in U.S. Pat. No. 3,942,645 (Aronson) wherein capsules are rectified via a rotatable gauging mechanism interposed between two cam plates. Any defective capsules or capsules which have been "hung up" on the gauging mechanism are purged from the machine by destruction thereof by the sharp edged portions of the lower cam and the upper cam.

Despite the many advantages afforded by the prior art capsule rectification devices, it is often difficult to obtain high efficiency rectification due to the fact that the processed capsules are lightweight and easily affected by air currents, dust accumulation and static electricity, which often times results in malfunctioning of the rectification means.

Accordingly, there remains a need for a rectification device of high efficiency and production which can effectively remove non-rectified capsules from the transported array especially before the capsules are presented to another work station.

The production of a rectification device which is also capable of removing the non-rectified capsules therefrom without the attendant complexity and expense of providing a separate capsule inspection station is highly desirable and of significant commercial interest.

Further, it is economically advantageous to provide a capsule rectification device which provides for the removal of non-rectified capsules from the transport mechanism without resulting in the destruction of the non-rectified capsules so that they can be subsequently reloaded and reprocessed.

Accordingly, it is an object of the present invention to provide a capsule rectification device of high efficiency and production which is capable of removing non-rectified capsules from the transported array before the capsules are presented to a downstream work station, such as a printing station.

It is a further object of the present invention to provide a capsule rectification device which is capable of removing non-rectified capsules therefrom without the need for a separate capsule inspection station.

These and other objects are met by the apparatus and method for removing non-rectified capsules from a capsule rectification and transport device herein disclosed which will be fully explained in conjunction with the appended drawings and following detailed description.

DRAWINGS

DETAILED DESCRIPTION

Figure 1:
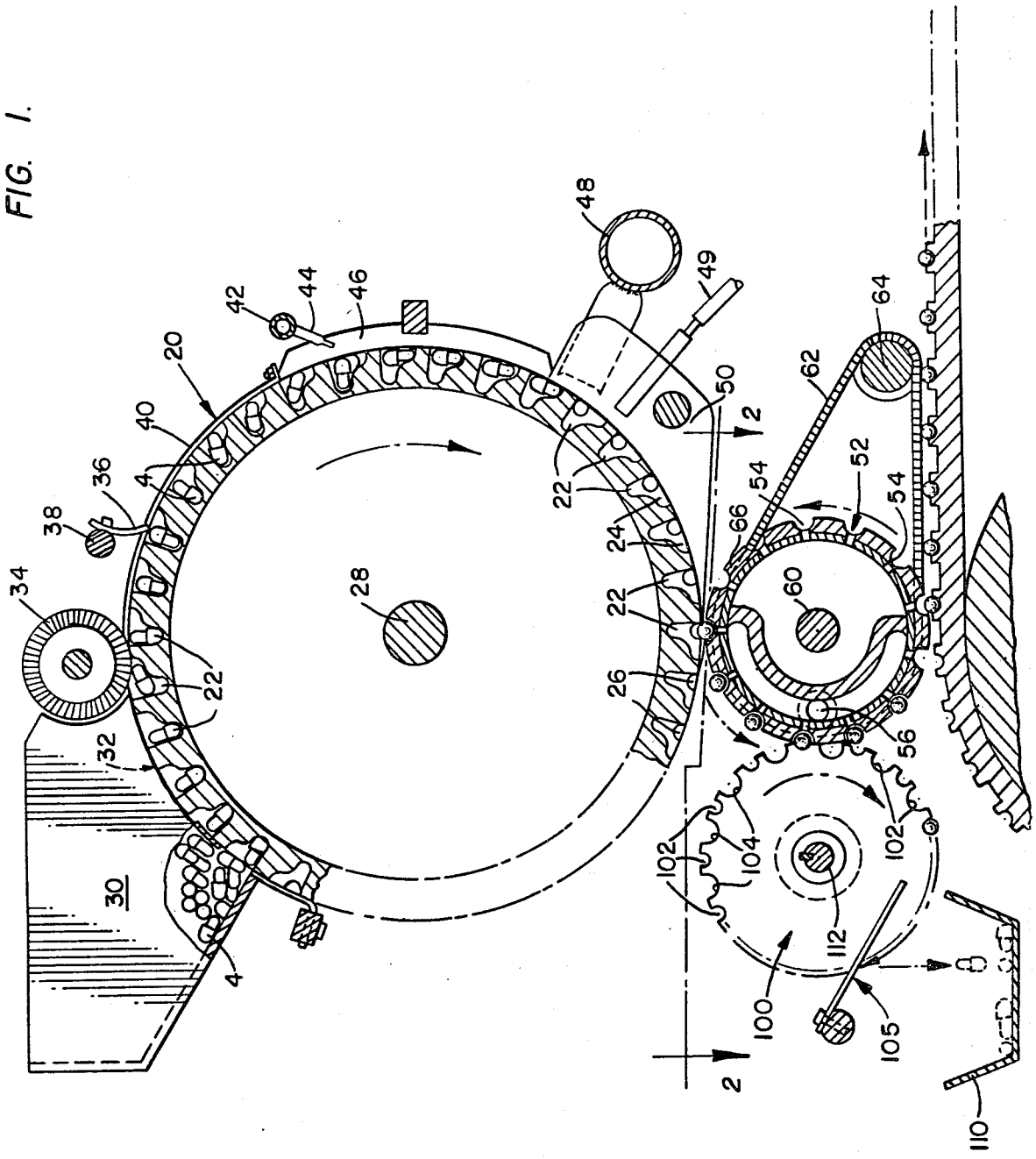
FIG. 1 is a view in side elevation, with certain parts shown in section.

In the specification which follows, specific terms will be used for the sake of clarity, and as descriptions of the specific forms of the invention which have been selected for illustration in the drawings. However, the use of such specific terms, and the use of such specific embodiments in the drawings, is not intended to imply any limitations with respect to the scope of the invention which is defined in the claims.

With reference to FIG. 1, there is shown a capsule rectification device and transport which includes capsule rectification means of the basic type disclosed in U.S. Pat. No. 4,104,966 (Ackley et al) and also shown in FIG. 7 of U.S. Pat. No. 3,931,884 (Ackley). The disclosures of these patents are hereby incorporated by reference so that the details as to the rectification process itself can be omitted herefrom.

With further reference to FIG. 1, there is shown a continuously rotatable transport cylinder 20 provided with capsule transport cavities comprising radially oriented pocket portions 22, pockets extending in the rotational direction of the cylinder (hereinafter transport oriented pockets 24), and axially oriented pockets 26. A plurality of adjacent rows of capsule transport cavities are provided on cylinder 20. Each row extends in the rotational direction of cylinder 20. The transport cylinder 20 is rotatably mounted on cylinder roll shaft 28, which shaft 28 is journaled in two side frame members as shown in U.S. Pat. No. 2,859,689.

A hopper 30 is positioned above the transport cylinder 20 and has an opening 32 in the bottom portion thereof, through which capsules 4 fall and are received in the pockets of the cylinder 20. A rotatable brush 34 is positioned immediately to the right of the hopper 30 as shown in FIG. 1. The brush bristles gently impinge upon the surface of the cylinder 20 and brush improperly aligned capsules into the radial pockets 22.

Tabs 36 positioned on shaft 38 extend across the width of the cylinder 20 and bear against the capsules 4 in each row of transport cavities so that the capsules are properly seated in the radial pockets 22. Alignment wires 40 extend in the transport direction of the cylinder 20 to prevent the capsules 4 from falling into the axial pocket portions 26.

Downstream from the alignment wires 40, a fluid manifold 42 and connecting fluid jet conduits 44 are positioned to supply a transport direction oriented stream of fluid upon the capsules. Gauging blocks 46 are positioned adjacent the cylinder surface to prevent forward tilting of "caps up" capsules into the transport oriented pockets 24 and to allow tilting of the body portions of the "caps down" capsules into the transport oriented pocket portions 24. The gauging blocks 46 also act as a means of inhibiting stray and eddy currents, which may develop from the fluid manifold 42 and fluid jet conduits 44, from affecting the neighboring rows of pockets as described in our aforementioned U.S. Pat. No. 4,104,966.

Downstream from the gauging block assembly 46, vacuum source 48 and cooperating air source 49 are positioned. The vacuum and cooperating air source draw upon the capsules 4 as they exit from the gauging block assembly to shift the capsules in a sidewise direction into the axial pockets 26 in rectified position as described in our aforementioned U.S. Pat. No. 4,104,966. The capsules are prevented from falling out of the axial pockets by the provision of arcuate guide 50 which holds the capsules in the cylinder pockets as they move toward the downside of the rotatable cylinder, prior to transfer to transfer cylinder 52 and associated pockets 54 located below cylinder 20.

In some cases it may be desirable to provide a means for pivoting the vacuum source and associated devices away from the transport cylinder 20. Such means are described and claimed in our copending U.S. patent application Ser. No. 905,742, filed May 15, 1978.

Transfer wheel 52 is mounted on axle 60 and is rotatable in tangential relation with respect to the cylinder 20. Rotation of cylinder 20 and transfer cylinder 52 are synchronized so the pockets 54 are presented directly beneath the transport cavities of the cylinder 20 at the time when the capsules emerge from the arcuate guide 50. In this manner, transfer of the rectified capsules from cylinder 20 to pockets 54 with the aid of vacuum source 56 is effected.

Figure 2:
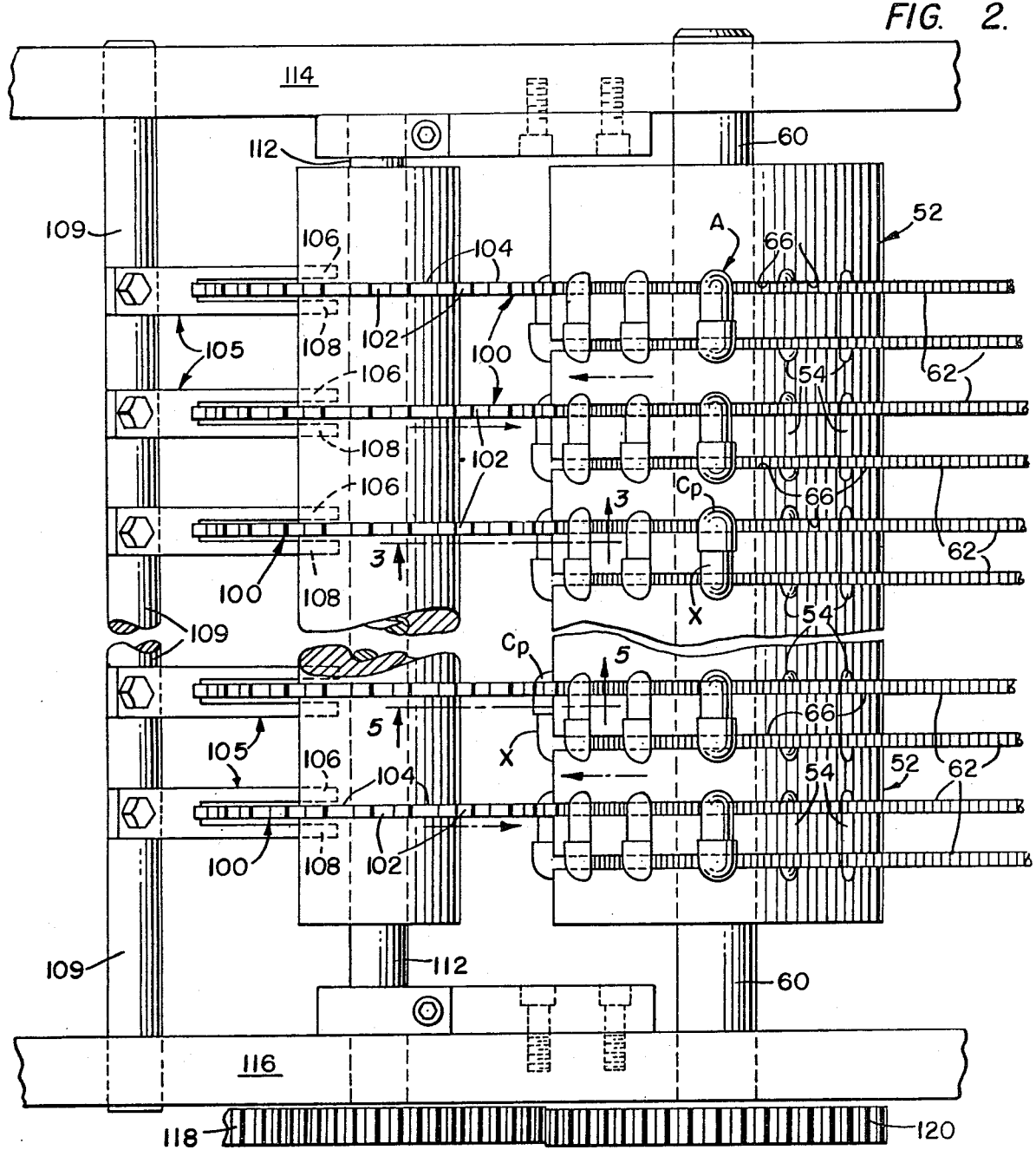
FIG. 2 is a fragmentary sectional view taken along the lines and arrows 2—2 of FIG. 1.

"O" ring tubes 62 are stretched about idler shaft 64 and are received in grooves 66 formed in transfer cylinder 52. A pair of tubes 62 is provided for each transport oriented row of pockets 54 of transfer cylinder 52. As best shown in FIG. 2, grooves 66 are positioned about the circumference of cylinder 52 in loci corresponding to opposite ends of the pockets 54. These tubes aid in release of the capsules to the pockets 68 carried by endless conveyor 70 after the properly rectified capsules have been transported approximately 180° about transfer cylinder 52. The tubes 62 are preferably composed of electrically conducting material and are grounded to either the idler shaft 64 or transfer cylinder 52. This is an important advantage in accordance with the invention, in view of the fact that static electricity is frequently developed to such an extent that difficulty is experienced in transferring the capsules from one portion to another.

As further shown in FIG. 1, rotatable pick off wheel 100 is splined to shaft 112 and is located adjacent transfer cylinder 52 for synchronous rotation therewith. Pick off wheel 100 comprises semi-circular cut-out sections 102, 104 which alternate about the periphery of the wheel. Cut-out section 102 is designed to have a width sufficient to firmly grasp a cap portion of a capsule therein but being too wide to grasp a body portion of a capsule therein.

Stripper 105 adjacent pick off wheel 100 is mounted on shaft 109 which extends across the width of the machine. Each stripper comprises two elongated stripping fingers 106, 108 which extend on opposite sides of the wheel 100. Hopper 110 is disposed below pick off wheel 100.

Figure 3:
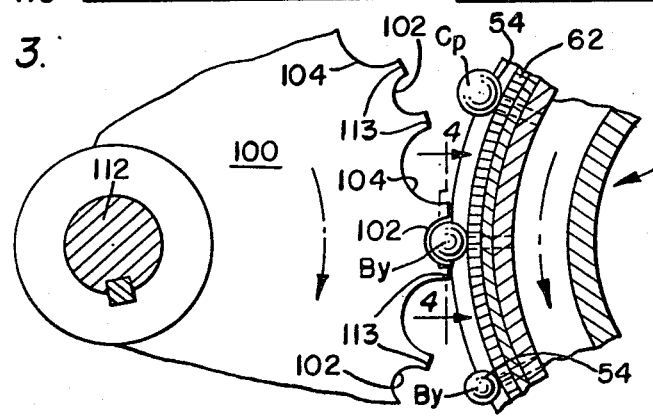
FIG. 3 is a fragmentary sectional view taken along the lines and arrows 3—3 of FIG. 2.
Figure 4:
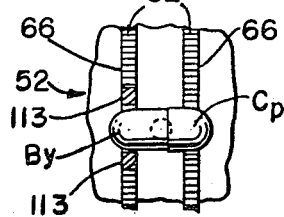
FIG. 4 is a fragmentary sectional view taken along the lines and arrows 4—4 of FIG. 3.
Figure 5:
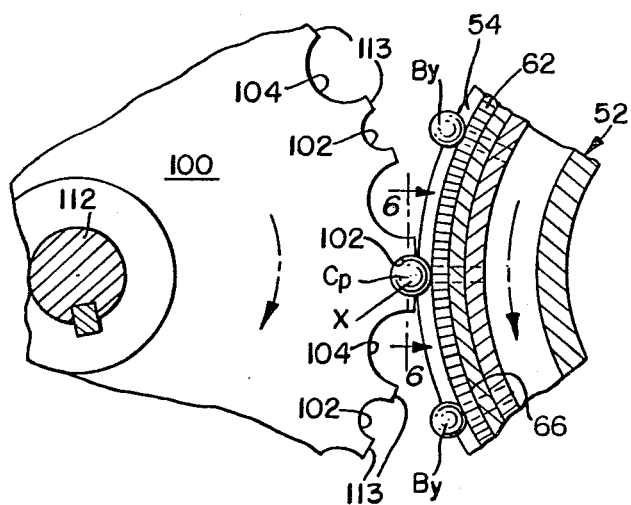
FIG. 5 is a fragmentary sectional view taken along the lines and arrows 5—5 of FIG. 2.
Figure 7:
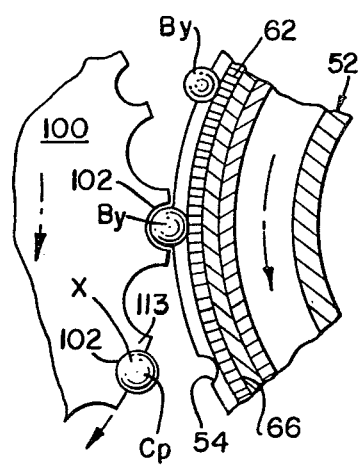
FIG. 7 is a fragmentary sectional view similar to FIG. 5, but illustrating the manner in which a non-rectified capsule is removed from the transport device in accordance with the invention.
Figure 6:
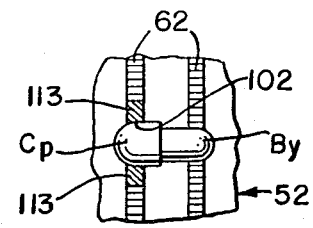
FIG. 6 is a fragmentary sectional view taken along the lines and arrows 6—6 of FIG. 5.

With reference now being made to FIGS. 2 through 8, the operation of the non-rectified capsule removal means in accordance with the invention will be explained. In FIGS. 3–4, operation of a pick off wheel is shown in conjunction with "properly rectified capsules" i.e., those capsules which are disposed with the cap portions Cp thereof extending toward one predetermined side of the pockets 54 (hereinafter referred to as the cap position) and with their bodies by extending in the opposite direction (hereafter referred to as the body position). In contrast, FIGS. 5–7 depict operation of the pick off wheel in removing "non-rectified" capsules from transfer cylinder 52. By the term "non-rectified" capsules, we mean those capsules in which the bodies By are disposed in the cap direction and in which the caps Cp are disposed in the body direction.

Specific reference now being made to FIGS. 2–4, shafts 60, 112 and 109 extend across side frames 114, 116 and are journalled therein. The shafts 60, 112 are driven by meshing gears 118, 120 respectively. It is to be noted that capsules in the vertically extending row of capsules, clearly marked vertical row "A" in FIG. 2, have been just received in the pockets 54 of the transfer cylinder 52 after transfer from cylinder 20 (FIG. 1). Capsules marked "X" in FIG. 2 are non-rectified capsules having cap portions Cp improperly extending in the body direction.

With attention now being directed to FIGS. 3 and 4, the operation of pick off wheel 100 in conjunction with the presentment of a properly rectified capsule thereto will be explained. In FIG. 3, it is noted that the outer teeth 113 of wheel 100 clear the surface of transfer cylinder 52. The By portion of a properly rectified capsule is presented in one of the slots 102 incident to the rotation of wheel 100 and cylinder 52. Approximately 180° of the capsule circumference protrudes from the surface of cylinder 52. However, the width of slot 102 is too great to grasp the body portion and thus the capsule will be free to rotate further on cylinder 52 until it is transferred to conveyor 70 (FIG. 1)

Turning now to FIGS. 5–7, capsules X are non-rectified, their cap portions Cp extend in the direction in which the body portions By of properly rectified capsules are normally disposed. In FIGS. 5 and 6, capsule X engages slot 102 and is firmly grasped therein. FIG. 7 depicts rotation of wheel 100 and cylinder 52 momentarily after capsule X has been grasped by slot 102. In FIG. 7, the cap portion Cp of capsule X is grasped by slot 102 and the capsule is carried to stripper fingers 106, 108 (FIGS. 1 and 2) where it is removed from wheel 100 and ejected into hopper 110 (FIG. 1).

It is an especially advantageous aspect of the present invention that the non-rectified capsules may then be loaded into the hopper 30 to be reprocessed in contrast to certain prior art devices which "purge" the machine of improperly processed capsules by destruction of the capsules.

Figure 8:
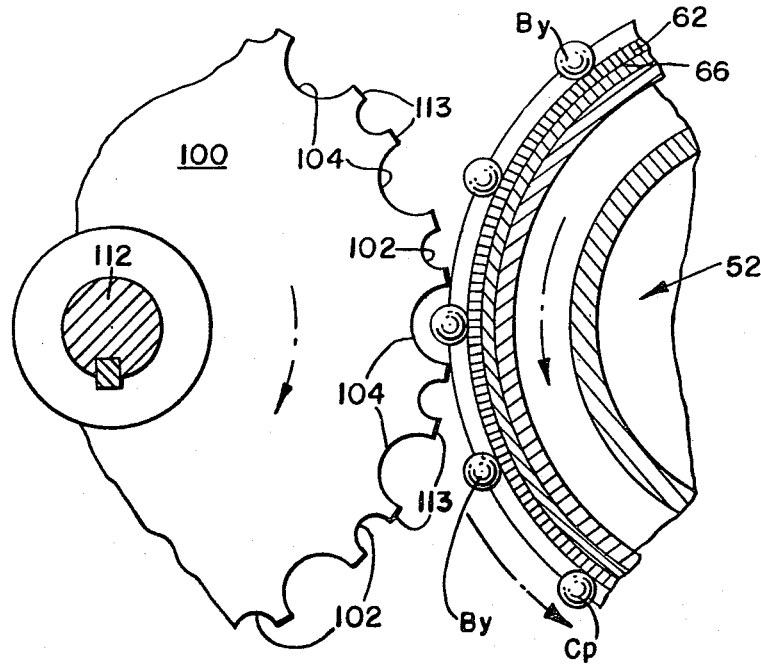
FIG. 8 is a fragmentary sectional view similar to FIGS. 5 and 7 but illustrating the selective mode of the non-rectified capsule removal means in accordance with the invention.

With reference to FIG. 8, it will be appreciated that by changing the relative angular positions of the wheels 100 about their shaft 112 (which may be done by altering the mesh positions between drive gears 120, 118 of FIG. 2), enlarged cut-out portions 104 will be presented adjacent the capsules instead of the selective slots 102. In this manner, the pick off wheel 100 may be inactivated if desired, and both rectified and improperly positioned capsules will be completely unaffected by rotation of the wheel 100, and all of the capsules carried by transfer cylinder 52 will be transferred to endless conveyor 70 (FIG. 1) due to the fact that the opening of cut-out portion 104 is too large to grasp either a cap portion Cp or body portion By of a capsule therein.

It has been found that the method and machine herein disclosed are capable of rectifying huge numbers of capsules per hour. As factors in achieving both speed and reliability, one pick off wheel 100 and one pair of associated stripper fingers 105 are provided for each row of capsules.

It will be further appreciated that the pick off wheel 100 may be positioned wherever desired. For example, it may be positioned adjacent to the pockets of cylinder 20 at a location downstream from the rectification means 42, 48. In such cases, the transfer cylinder 52 can be completely omitted if desired, and the properly rectified capsules may be transferred directly from cylinder 20 to endless conveyor 60.

It will be appreciated that other modifications may be made in the form of the machine and method herein disclosed, including reversal of parts, substitution of equivalent members, and the use of certain features of the invention independently of others, all within the spirit and scope of the invention as defined in the appended claims.

We claim:

1. In a capsule rectification apparatus adapted to rectify capsules having body portions and having cap portions which are of greater diameter than said body portions, and wherein an introduction means is provided from which a multiplicity of capsules may be introduced into said rectification apparatus, and wherein a rectification means is disposed for rectifying said capsules in dispositions in which the said cap portions, are oriented toward one side of a predetermined path and in which said body portions are oriented toward another side of the predetermined path as said capsules are moved along said predetermined path and wherein occasional capsules are sometimes improperly positioned in a non-rectified manner with their cap and body positions reversed, the combination which comprises:

(a) means positioned adjacent said predetermined path for contacting said improperly positioned capsules as they are carried along said predetermined path; said means (a) comprising pick-off means located adjacent said predetermined path and engagement means for grasping said improperly positioned capsules, said engagement means being shaped in such manner so as to grasp only improperly positioned capsules while not being capable of grasping properly positioned capsules and said engagement means comprises cap portions grasping means carried by said pick-off means for grasping cap portions of non-rectified capsules, wherein said cap portion grasping means comprises a plurality of cut-out grasping elements spaced apart from each other around the periphery of said pick off means, said grasping elements being shaped and dimensioned to firmly grasp a cap portion therein, but being dimensioned such as to be incapable of grasping a body portion therein, and wherein said pick-off means is positioned alongside a portion of said predetermined path where the body portions of properly rectified capsules are to be located, whereby said cap portions grasping means is adapted to grasp any non-rectified capsule having its cap portion disposed into the same direction as the body portions of said properly rectified capsules and (b) means for removing said improperly positioned capsules from said path, said removing means including a stripping means for stripping capsules from said engagement means.

2. The capsule rectification apparatus defined in claim 1 wherein said stripping means comprises a pair of elongated stripping fingers defining an elongated slot therebetween and wherein said engagement means is positioned to move between said fingers.

3. The capsule rectification apparatus defined in claim 1 further comprising collection means disposed adjacent said stripping means for collection of previously improperly positioned capsules therein.

4. In a capsule rectification and transport device, the combination comprising hopper means into which a multiplicity of capsules are to be loaded, an endless conveyor, transport means for receiving said capsules from said hopper and for transporting them along a predetermined path to said endless conveyor, said transport means comprising a first rotatable cylinder having a plurality of spaced capsule receiving pockets formed therein, said first cylinder being positioned adjacent said hopper in a position to receive capsules therefrom, and wherein a second continuously rotatable cylinder is disposed below said first cylinder, said second cylinder being adapted to rotate substantially tangentially with respect to said first cylinder to receive capsules therefrom, said second cylinder having a plurality of spaced capsule receiving pockets therein, and wherein an endless conveyor is provided, said second cylinder being disposed above said endless conveyor to transfer capsules thereto, means for rectifying said capsules as they are transported by said transport means in dispositions in which said cap portions lie along one side of the predetermined path and in which said body portions lie on the opposite side of the predetermined path, the non-rectified capsule removal means located adjacent said transport means for eliminating non-rectified capsules from said transport means said non-rectified capsule removal means comprising engagement means for grasping non-rectified capsules and being shaped in such manner so as to grasp only non-rectified capsules while not being capable of grasping properly rectified capsules.

5. A capsule rectification and transportation device as defined in claim 4 wherein said non-rectified capsule removal means also comprises a rotatable pick-off wheel positioned for rotation substantially tangentially with respect to said second cylinder, and wherein said engagement means comprise capsule cap portion grasping means carried by said pick off wheel and positioned for grasping the cap portions of non-rectified capsules as said capsules are carried by said second cylinder.

6. A capsule rectification and transportation device as defined in claim 5 further including stripping means operatively associated with said capsule cap portion grasping means for stripping improperly rectified capsules therefrom.

7. A capsule rectification and transportation device as defined in claim 6 further including a second hopper disposed below said stripping means.

8. A capsule rectification and transportation device as defined in claim 7 wherein said capsule cap grasping means comprises a plurality of gripping elements located around the periphery of said pick off wheel, said gripping elements being dimensioned to grasp a cap portion of a non-rectified capsule therein, said gripping elements being so dimensioned as not to grasp a body portion, and wherein means are provided for rotating said pick off wheel in timed relation to rotation of said second cylinder.

9. A capsule rectification and transportation device as defined in claim 8 wherein said stripping means comprises a pair of elongated stripping fingers.

10. A method for transporting and rectifying capsules of the type having body portions and having cap portions of greater transverse dimension than said body portions, wherein said capsules are arranged in a plurality of adjacent rows which extend in a transport direction and wherein said capsules are rectified in dispositions in which the cap portions of a row of capsules face a predetermined direction and in which the body portions of said capsules face in substantially opposite direction, and wherein capsules are sometimes improperly position in non-rectified manner with their cap and body portions reversed, the steps which comprise providing a capsule engagement means, shaping said capsule engagement means in such manner so as to grasp only non-rectified capsules while being incapable of grasping said properly rectified capsules, grasping said non-rectified capsules with said engagement means and stripping said grasped capsules away after having grasped them to remove the grasped non-rectified capsules from the array while allowing the properly rectified capsules to continue in said array.

11. A method for transporting and rectifying capsules of the type having body portions and having cap portions of greater transverse dimension than said body portions, wherein said capsules are arranged in a plurality of adjacent rows which extend in a transport direction and wherein said capsules are rectified in dispositions in which the cap portions of a row of capsules face a predetermined direction and in which the body portions of said capsules face in substantially opposite direction, and wherein capsules are sometimes improperly positioned in non-rectified manner with their cap and body portions reversed, the steps which comprise providing a capsule engagement means, shaping said capsule engagement means in such manner so as to grasp only non-rectified capsules while being incapable of grasping said properly rectified capsules, grasping said non-rectified capsules with said engagement means and the grasped non-rectified capsules from the array while allowing the properly rectified capsules to continue in said array.

12. In a capsule rectification and transport device, the combination comprising hopper means into which a multiplicity of capsules are to be loaded, an endless conveyor, transport means for receiving said capsules from said hopper and for transporting them along a predetermined path to said endless conveyor, means for rectifying said capsules as they are transported by said transport means in dispositions in which said cap portions lie along one side of the predetermined path and in which said body portions lie on the opposite side of the predetermined path, and non-rectified capsule removal means located adjacent said transport means for eliminating non-rectified capsules from said transport means, wherein said transport means comprise a first rotatable cylinder having a plurality of spaced capsule receiving pockets formed therein, said first cylinder being positioned adjacent said hopper in a portion to receive capsules therefrom, and wherein a second continuously rotatable cylinder is disposed below said first cylinder, said second cylinder being adapted to rotate substantially tangentially with respect to said first cylinder to receive capsules therefrom, said second cylinder having a plurality of spaced capsule receiving pockets therein, and wherein an endless conveyor is provided, said second cylinder being disposed above said endless conveyor to transfer capsules thereto.

13. A capsule rectification and transportation device as defined in claim 12 wherein said non-rectified capsule removal means comprises a rotatable pick-off wheel positioned for rotation substantially tangentially with respect to said second cylinder, capsule cap portion grasping means carried by said pick off wheel and positioned for grasping the cap portions of non-rectified capsules as said capsules are carried by said second cylinder.

14. A capsule rectification and transportation device as defined in claim 13 further including stripping means operatively associated with said capsule cap portion grasping means for stripping improperly rectified capsules therefrom.

15. A capsule rectification and transportation device as defined in claim 14 further including a second hopper disposed below said stripping means.

16. A capsule rectification and transportation device as defined in claim 15 wherein said capsule cap grasping means comprises a plurality of gripping elements located around the periphery of said pick off wheel, said gripping elements being dimensioned to grasp a cap portion of a non-rectified capsule therein, said gripping elements being so dimensioned as not to grasp a body portion, and wherein means are provided for rotating said pick off wheel in timed relation to rotation of said second cylinder.

17. A capsule rectification and transportation device as defined in claim 16 wherein said stripping means comprises a pair of elongated stripping fingers.

18. In a capsule rectification apparatus adapted to rectify capsules having body portions and having cap portions which are of greater diameter than said body portions, and wherein an introduction means is provided from which a multiplicity of capsules may be introduced into said rectification apparatus, and wherein a rectification means is disposed for rectifying said capsules in dispositions in which said cap portions are oriented toward one side of a predetermined path and in which said body portions are oriented toward another side of the predetermined path as said capsules are moved along said predetermined path and wherein occasional capsules are sometimes improperly positioned in a non-rectified manner with their cap and body positions reversed, the combination which comprises:
- (a) means positioned adjacent said predetermined path for contacting said improperly positioned capsules as they are carried along said predetermined path; and
- (b) means for removing said improperly positioned capsules from said path, wherein said removal means (b) includes a stripping means for stripping capsules from said means (a).

19. Capsule rectification apparatus as defined in claim 18, wherein said stripping means comprises a pair of elongated stripping fingers defining an elongated slot therebetween and wherein said means (a) is positioned to move between said fingers.

20. Capsule rectification apparatus as defined in claim 18 further comprising collection means disposed adjacent said stripping means for collecting previously improperly positioned capsules therein.

21. A method for transporting and rectifying capsules of the type having body portions and having cap portions of greater transverse dimension than said body portions, wherein said capsules are arranged in an array comprising at least one row of capsules extending in a predetermined path, and wherein said capsules are rectified in dispositions in which the cap portions of a row of capsules face a predetermined direction and in which the body portions of said capsules face in substantially opposite direction, and wherein occasioned capsules are sometimes improperly dimensioned in a non-rectified manner with their cap and body portions reversed, the steps which comprise selectively contacting said non-rectified capsules in each row and removing the contacted non-rectified capsules from the array while causing the properly rectified capsules to continue in said array, and comprising the step of stripping said contacted capsules away after having contacted them.

22. The method as defined in claim 21 wherein said capsules are arranged in a plurality of adjacent rows which extend in a transport direction.

* * * * *